May 6, 1969  E. KUHN  3,443,200
EXCITATION SYSTEM FOR GENERATORS
Filed Dec. 14, 1966

INVENTOR
Edgar Kuhn
by Michael J. Striker
Atty

United States Patent Office

3,443,200
Patented May 6, 1969

3,443,200
EXCITATION SYSTEM FOR GENERATORS
Edgar Kuhn, Gerlingen, Germany, assignor to Robert Bosch G.m.b.H., Stuttgart, Germany
Filed Dec. 14, 1966, Ser. No. 601,586
Claims priority, application Germany, Dec. 30, 1965, B 85,205
Int. Cl. H02p 9/26; H02h 7/06
U.S. Cl. 322—24    14 Claims

ABSTRACT OF THE DISCLOSURE

A controlled excitation system for a generator to insure constant load voltage. A set of rectifiers is connected to the load windings to supply the field current through a controlled series transistor, and to establish a reference voltage. The control voltage for the series transistor is derived by circuitry responsive to changes in said reference voltage and responsive to the difference between the load voltage and the reference voltage.

Background of the invention

This invention relates to an excitation system for generators and more particularly to a system for controlling the excitation current in a multiphase alternating current generator.

In conventional regulators systems for alternating current generators used, for example, in commercial vehicles, voltage regulation may be achieved under normal operating conditions. However, satisfactory regulation is not achieved under conditions of extremely low loads, varying speeds, and excessive loads.

Summary of the invention

It is an object of this invention to devise a voltage regulator system for an alternating current generator wherein the voltage at the load is maintained even when an excessive load is supplied.

It is an object of this invention to supply a regulator system for an alternating current generator wherein the load voltage is maintained even under no load conditions.

It is a further object of this invention to supply a regulator system for an alternating current generator such that the load voltage is maintained under conditions of varying speed.

In accordance with this invention, an alternating current generator having a field winding, load windings, a first set of rectifiers connected to said load windings and output conductor means connected to said first rectifier set and adapted to yield a desired load voltage, has in addition, a second rectifier set connected to the load windings. This second rectifier set yields a reference voltage and also supplies the exciter current for said field winding. Comparison means compare the reference voltage to the load voltage. First circuit means furnish a control voltage as a function of changes in said reference voltage and as a function of the output of said comparison circuit. Control circuitry responsive to said control voltage inhibits the flow of excitation field current to said field winding when said load voltage exceeds said desired load voltage and increases said excitation field current when the load voltage is less than said desired load voltage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiments

Figure 1:
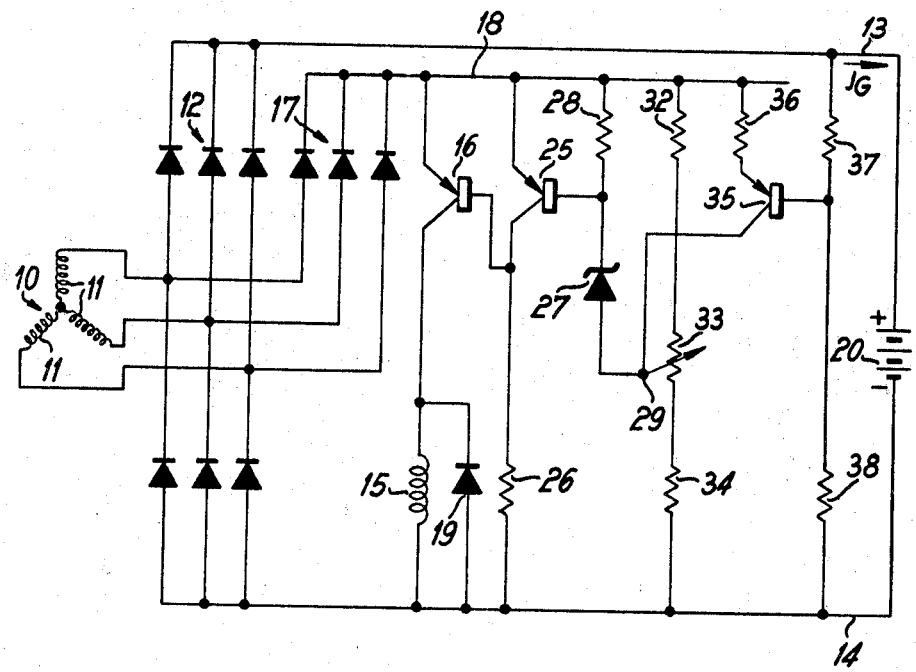
FIG. 1 is a schematic diagram of a preferred form of regulator system embodying my invention.

In FIG. 1 the alternating current generator shown at 10 has armature windings 11, a first rectifier set 12 connected to these armature windings and load conductors 13 and 14 connected to the first rectifier set. A second set of rectifiers 17 is used to establish the voltage reference line 18. The field winding 15, connected in series with the emitter-collector path of power transistor 16, is connected from line 18 to the load conductor 14. A damping diode 19 is connected across the field winding 15. A first voltage divider comprising impedances 32 and 34 and variable impedance 33 connected in series is connected from line 18 to the negative load conductor 14. A second voltage divider comprising impedances 37 and 38, connected in series, is connected from load conductor 13 to load conductor 14. A comparison transistor 35 has its base connected to the common point of impedances 37 and 38, the collector connected to the variable arm of impedance 33, and the emitter connected to a decoupling impedance 36, whose other terminal is connected to the reference voltage line 18. Zener diode 27 is connected to the collector of comparison transistor 35 and has a plate connection to impedance 28, whose other terminal is also connected to reference voltage line 18. The base of amplifying transistor 25 is connected to the plate of the Zener diode 27. The emitter of transistor 25 is connected to reference voltage line 18 and the collector is connected to impedance 26, whose second terminal is connected to negative load conductor 14. The base of control transistor 16 is connected to the collector of transistor 25.

The operation of the circuit may be explained as follows:

The value of impedance 33 is set in such a way that Zener diode 27 is in the conducting stage when the output voltage is at its desired value under normal operating conditions. If the generator voltage of the alternating current generator 10 were to drop, the reference voltage 18 would decrease, thus causing Zener diode 27 to cease conducting. When this diode becomes nonconducting no base current flows in transistor 25 and this also becomes nonconducting. Therefore, the control voltage, namely the voltage at the base of transistor 16 will be highly negative, thus permitting base current to flow and putting transistor 16 into a conducting condition. The resultant increase in excitation field current in the field winding 15 will then result in a rise of the voltage 18 and the load voltage, as desired. If now reference voltage 18 were to reach too high a value, Zener diode 27 would be put in the conducting condition, base current would flow in transistor 25, allowing collector-emitter current to flow in transistor 26. The base of transistor 16 would thus be biased highly positive, cutting off transistor 16, and interrupting the flow of field current which would then result in a decrease in reference voltage 18 and in the load voltage.

However, the possibility exists that the load voltage, namely the voltage from conductor 13 to conductor 14, decreases due to excessive drops in the load line and in the rectifier set 12 under excessive load conditions, even though reference voltage 18 has maintained its proper value. If the voltage from conductor 13 to conductor 14 drops, the emitter of comparison transistor 35 will be positive with respect to its base and therefore conducting current will flow from the emitter to the collector of transistor 35. This will result in a higher positive voltage at tap 29 of variable impedance 33 which in turn will cause the Zener diode 27 to cut off. When this diode is cut off as previously explained transistor 16 will be put into the conducting mode, increased field current will flow and the load voltage will be properly increased.

Figure 2:
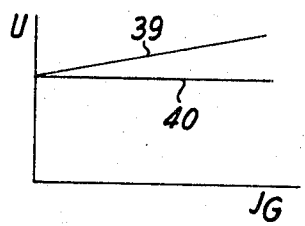
FIG. 2 shows possible load voltage and generator voltage variation with load current in a system embodying my invention.

As shown in FIG. 2 it is possible under the foregoing conditions of excessive line and rectifier drops due to high loads to increase the generated voltage, shown as curve 39 in FIG. 2, to such a point that the load voltage, indicated as curve 40 in FIG. 2 remains constant with increasing values of load current $J_G$.

If the voltage between conductors 13 and 14 should rise excessively under no load conditions the base of transistor 35 would be positive with respect to its emitter and transistor 35 would be blocked completely. This would cause the voltage at tap 29 to drop somewhat from the normal value, which in turn would cause the Zener diode 27 to conduct. As previously explained this would block transistor 16 and cut off the supply of field current, thus decreasing the load voltage and protecting the load from overvoltages.

It will be understood that each of the elements described above, or two or more together, may also find a useful application in other types of excitation systems differing from the type described above.

Without further analysis, the foregoing will so fully reveal the gist of the present invention, that others can, by applying current knowledge readily adapt it for various applications without omitting features that, from the standpoint of prior art fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims.

I claim:

1. A static excitation system for an alternating current generator having a field winding, load windings, a first set of rectifier means connected to said load windings and output conductors connected to said first rectifier set and adapted to yield a desired load voltage, comprising, in combination, second rectifier means connected to said load windings and adapted to yield a first reference voltage and adapted to supply the excitation current for said field winding; first comparing means responsive to a difference between said first reference voltage and said load voltage and adapted to yield a comparison voltage; first circuit means responsive to a change in said reference voltage and responsive to said comparison voltage and adapted to yield a control voltage; and control means responsive to said control voltage and adapted to control the flow of excitation current to said field winding.

2. An excitation system for an alternating current generator as set forth in claim 1 wherein said control means is adapted to have a conducting operating mode permitting the passage of excitation field current to said field winding and a nonconducting operating mode inhibiting the passage of excitation field current to said field winding.

3. An excitation system for an alternating current generator as set forth in claim 2 wherein said control voltage causes the control means to be in the conducting mode when said load voltage is below said desired load voltage.

4. A static excitation system for an alternating current generator as set forth in claim 1 wherein said first circuit means comprise variable impedance means having an impedance controlled by changes in said reference voltage and by said comparison voltage; and amplifying means controlled by said variable impedance means and adapted to furnish said control voltage.

5. An excitation system for an alternating current generator as set forth in claim 1 also comprising first voltage divider means adapted to furnish a fraction of said first reference voltage at a reference voltage divider tap.

6. An excitation system for an alternating current generator as set forth in claim 1 wherein said comparison means comprise second voltage divider means adapted to yield a fraction of said load voltage at a load voltage divider tap and second amplifier means responsive to the difference between said fraction of said load voltage and said reference voltage and adapted to yield said comparison voltage.

7. An excitation system for an alternating current generator as set forth in claim 6, wherein said second amplifier means comprise a transistor having an emitter and a base.

8. An excitation system for an alternating current generator as set forth in claim 7, also comprising a decoupling impedance serially connected to said emitter.

9. An excitation system for an alternating current generator as set forth in claim 8, wherein said base of said transistor is connected to said load voltage divider tap and said emitter is connected in series with said decoupling impedance to said voltage reference line; and wherein said load voltage divider tap is positioned to allow flow of base current when said load voltage is at the desired value.

10. In an excitation system for an alternating current generator having a field winding, load windings, a first set of rectifiers connected to said load windings and output conductor means connected to said first set of rectifiers and adapted to yield a desired load voltage, said excitation system including second rectifier means connected to said load windings, adapted to yield a first reference voltage and adapted to supply the excitation current for said field winding, in combination: means for comparing said load voltage to said reference voltage and generating a comparison voltage; and means for coupling said comparison voltage into said excitation system, such that said excitation system will increase the excitation field current if said load voltage is less than said reference voltage and will decrease said excitation field current if said load voltage is greater than said reference voltage.

11. A system as set forth in claim 10, wherein said comparing means comprise the control elements of amplifier means and said coupling means comprise the output elements of amplifier means.

12. A system as set forth in claim 10, wherein said comparing means comprise the emitter-base circuit of a transistor and said coupling means comprise the emitter collector circuit of said same transistor.

13. A system as set forth in claim 10, also comprising second voltage divider means adapted to furnish a fraction of said load voltage to said control element of said amplifier means at a load voltage divider tap.

14. A system as set forth in claim 12, also comprising a decoupling impedance in said emitter collector circuit.

References Cited

UNITED STATES PATENTS 3,378,708  4/1968  Baker _____ 322—73 X

OTHER REFERENCES

German printed application 1,132,224, June 1962.
German printed application 1,176,248, August 1964.

ORIS L. RADER, *Primary Examiner.*

H. HUBERFELD, *Assistant Examiner.*

U.S. Cl. X.R.

322—28, 36, 73